United States Patent
Joo

(10) Patent No.: US 6,175,903 B1
(45) Date of Patent: Jan. 16, 2001

(54) DUPLEXING SYSTEM AND METHOD FOR WRITING RESERVE LIST THEREOF

(75) Inventor: Dae-Hyun Joo, Kyoungki-do (KR)

(73) Assignee: Hyundai Electronics Ind. Co., Ltd., Kyoungki-do (KR)

( * ) Notice: Under 35 U.S.C. 154(b), the term of this patent shall be extended for 0 days.

(21) Appl. No.: 09/026,597

(22) Filed: Feb. 20, 1998

(30) Foreign Application Priority Data

Apr. 18, 1997 (KR) .................................................. 97-14474

(51) Int. Cl.[7] .................................................. G06F 12/00
(52) U.S. Cl. ........................................... 711/162; 711/158
(58) Field of Search .................................... 711/162, 165, 711/161, 158; 371/2, 1, 3; 714/6; 395/182.1, 553

(56) References Cited

U.S. PATENT DOCUMENTS

| | | | |
|---|---|---|---|
| 4,625,308 | * 11/1986 | Kim et al. | 370/321 |
| 5,051,887 | * 9/1991 | Berger et al. | 711/162 |
| 5,422,837 | 6/1995 | Boothroyd et al. | 712/36 |
| 5,426,765 | 6/1995 | Stevens et al. | 711/131 |
| 5,809,543 | * 9/1998 | Byers et al. | 711/162 |
| 5,864,657 | * 1/1999 | Stiffler | 395/182.13 |
| 5,864,677 | * 1/1999 | Loo | 709/232 |
| 5,870,537 | * 2/1999 | Kern et al. | 714/6 |
| 5,966,730 | * 10/1999 | Zulch | 711/162 |

* cited by examiner

Primary Examiner—John W. Cabeca
Assistant Examiner—Matthew D. Anderson
(74) Attorney, Agent, or Firm—Reed Smith Shaw & McClay LLP

(57) ABSTRACT

A duplexing system and method for writing a back-up list in which a back-up process is substituted for a process having an error while performing plural processes. Memory space to store a back-up order list is allotted to two bytes per process. A number of the leading order process is stored in the first byte, whereas a number of following order process is stored in the second byte. Further, the top priority bit or the last bit of each byte of memory space in which the process to be backed-up is allotted is set, and thus the existence of a registration is displayed. Further, if error an occurs at plural processes, a non back-up process generates a back-up order list according to time sequence of error generation. If an error occurs at a process of another top priority order while operating a back-up of a back-up process, the process is registered at the leading order list. If a process in a back-up procedure is restored at the present back-up process, the back-up process is in a waiting status, and the top priority order process is detected from a back-up list memory and is backed-up. If any one process among processes registered in the present back-up list memory is restored, a corresponding item is deleted from a back-up list memory. The leading item is connected to the following item, and thus an order retrieval of a back-up list is conveniently performed.

9 Claims, 12 Drawing Sheets

| | | |
|---|---|---|
| XX00H | 0 | 0 | P0
| XX02H | 0 | 0 | P1
| XX04H | 80H | 85H | P2
| XX06H | 0 | 0 | P3
| XX08H | 83H | 80H | P4
| XX0AH | 0 | 0 | P5
| XX0CH | 0 | 0 | P6
| ⋮ | ⋮ | ⋮ |
| | 0 | 0 | PN−1

| | | |
|---|---|---|
| XX00H | 0 | 0 | P0
| XX02H | 0 | 0 | P1
| XX04H | 80H | 85H | P2
| XX06H | 0 | 0 | P3
| XX08H | 83H | 87H | P4
| XX0AH | 0 | 0 | P5
| XX0CH | 85H | 80H | P6
| ⋮ | ⋮ | ⋮ |
| | 0 | 0 | |

FIG. 4

| MSB | | | | | | | LSB |
|---|---|---|---|---|---|---|---|
| 1 | 0 | 0 | 0 | 0 | 0 | 0 | 0 |
| B7 | B6 | B5 | B4 | B3 | B2 | B1 | B0 |

FIG. 7

| Address | | | Port |
|---|---|---|---|
| XX00H | 0 | 0 | P0 |
| XX02H | 80H | 85H | P1 |
| XX04H | 0 | 0 | P2 |
| XX06H | 0 | 0 | P3 |
| XX08H | 82H | 89H | P4 |
| XX0AH | 0 | 0 | P5 |
| XX0CH | 0 | 0 | P6 |
| XX0EH | 0 | 0 | P7 |
| XX10H | 85H | 80H | P8 |
| XX12H | 0 | 0 | P9 |
| XX14H | 0 | 0 | |
| ⋮ | 0 | 0 | ⋮ |

| | | |
|---|---|---|
| XX00H | | | P0
| | 80H | 85H | P1
| XX02H | | |
| XX04H | | | P2
| XX06H | | | P3
| | 82H | 89H | P4
| XX08H | | |
| XX0AH | | | P5
| XX0CH | | | P6
| XX0EH | | | P7
| | 85H | 80H | P8
| XX10H | | |
| XX12H | | | P9
| XX14H | | |

| | | |
|---|---|---|
| XX00H | | | P0
| | 88H | 89H | P1
| XX02H | | |
| XX04H | | | P2
| XX06H | | | P3
| | 82H | 89H | P4
| XX08H | | |
| XX0AH | | | P5
| XX0CH | | | P6
| | 80H | 82H | P7
| XX0EH | | |
| | 85H | 80H | P8
| XX10H | | |
| XX12H | | | P9
| XX14H | | |

| | | |
|---|---|---|
| XX00H | 0 | 0 | P0
| XX02H | 80H | 85H | P1
| XX04H | 0 | 0 | P2
| XX06H | 0 | 0 | P3
| XX08H | 82H | 89H | P4
| XX0AH | 0 | 0 | P5
| XX0CH | 0 | 0 | P6
| XX0EH | 0 | 0 | P7
| XX10H | 85H | 80H | P8
| XX12H | 0 | 0 | P9
| XX14H | 0 | 0 |
| ⋮ | 0 | 0 | ⋮

| | | |
|---|---|---|
| XX00H | 0 | 0 | P0
| XX02H | 80H | 89H | P1
| XX04H | 0 | 0 | P2
| XX06H | 0 | 0 | P3
| XX08H | 0 | 0 | P4
| XX0AH | 0 | 0 | P5
| XX0CH | 0 | 0 | P6
| XX0EH | 0 | 0 | P7
| XX10H | 82H | 80H | P8
| XX12H | 0 | 0 | P9
| XX14H | 0 | 0 |
| ⋮ | 0 | 0 | ⋮

| | | |
|---|---|---|
| XX00H | 0 | 0 | P0
| XX02H | 80H | 85H | P1
| XX04H | 0 | 0 | P2
| XX06H | 0 | 0 | P3
| XX08H | 82H | 80H | P4
| XX0AH | 0 | 0 | P5
| XX0CH | 0 | 0 | P6
| XX0EH | 0 | 0 | P7
| XX10H | | | P8
| XX12H | 0 | 0 | P9
| XX14H | 0 | 0 |
| ⋮ | 0 | 0 | ⋮

| | | |
|---|---|---|
| XX00H | 0 | 0 | P0
| XX02H | 80H | 80H | P1
| XX04H | 0 | 0 | P2
| XX06H | 0 | 0 | P3
| XX08H | 0 | 0 | P4
| XX0AH | 0 | 0 | P5
| XX0CH | 0 | 0 | P6
| XX0EH | 0 | 0 | P7
| XX10H | 82H | 80H | P8
| XX12H | 0 | 0 | P9
| XX14H | 0 | 0 |
| ⋮ | 0 | 0 | ⋮

DUPLEXING SYSTEM AND METHOD FOR WRITING RESERVE LIST THEREOF

BACKGROUND OF THE INVENTION

1. Field of the Invention

The present invention relates to a duplexing system, and more particularly, to a duplexing system and method for writing a reserve list thereof, by which a reserve list is conveniently set up during a processor error, and priority procedure order is forced to occur during a critical process.

2. Description of the Prior Art

Typically, in a system comprising a processor which can operate plural independent jobs, if that duplexing function is automatically performed by an auxiliary processor, owing to a single auxiliary or when error is generated in plural processors simultaneously, each reserve list is stored in memory in order of the error generation in a time sequence. That is, regardless which processor is important, the reserve list is written by the method in which error data of processor is sequentially registered in a reserve list in the error generation time order.

In the conventional writing method of a reserve list by which the reserve list is written in an error generation time order, if a processor item occupied at a middle portion of the list has to be deleted for an error restored processor to be eliminated from a list, the following order corresponding to the item is shifted ahead in one step as shown in FIG. 12A, whereas if processor item has to be inserted in a middle portion of the list, the following item relative to the inserted item is shifted back in one step as shown in FIG. 12B. That causes a problem that the procedure is very complicated and a larger data storage memory is required.

Further, since error data is absolutely registered in a reserve list corresponding to an error generation time during error of critical processor, and not following the priority order, it causes another problem of a malfunction of the duplexing procedure.

SUMMARY OF THE INVENTION

Therefore, it is an object of the present invention to provide a duplexing system and method for writing a reserve list thereof for solving the problems.

It is another object of the present invention to provide a duplexing system and method for writing a reserve list thereof by which a reserve list can be conveniently changeable while generating an error in a processor.

It is another object of the present invention to provide a duplexing system and method for writing a reserve list thereof by which a priority order is accessed to a critical processor in a forced manner.

In order to achieve the above objects of the present invention, memory space to store a reserve order list is allotted to two bytes per one processor. A number of leading order processor is stored in a first byte, whereas a number of the following order processor is stored in the second byte. Further, the top priority bit or the last bit of each byte of memory space in which the processor to be backed-up is allotted is set, and thus the existence of a registration is displayed.

Further, if an error occurs at plural processors, a non channel card generates a reserve list according to a time sequence of error generation. If an error occurs at a processor of another top priority order while operating a back-up of a channel card, the processor is registered at the leading order list. If processor in a back-up procedure is restored at the present channel card, the channel card is maintained in a waiting status, and the top priority order processor is detected from a back-up list memory and is reserve. If any one processor among the processor registered in the present reserve list memory is restored, a corresponding item is deleted from a reserve list memory. The leading item is connected to the following item, and thus an order retrieval of a reserve list is conveniently performed.

BRIEF DESCRIPTION OF THE DRAWINGS

FIG. 4 is an embodiment showing the status of a temporary memory location;

FIG. 7 is representation that one processor is registered in a reserve list memory.

DESCRIPTION OF THE PREFERRED EMBODIMENT

The present invention will be better clarified by describing a preferred embodiment thereof with reference to the above accompanying drawings.

Figure 1:
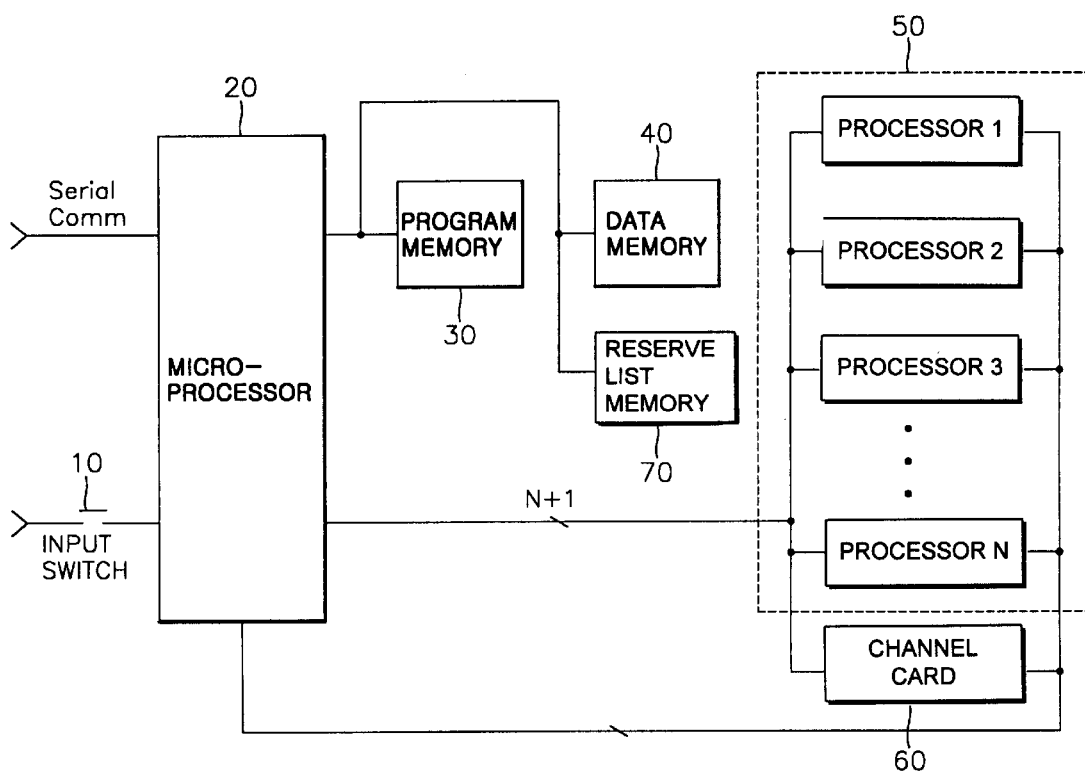
FIG. 1 is a block diagram schematically showing a duplexing system according to a present invention.

A duplexing system, as shown in FIG. 1, is provided with an input switch 10 serving as a control device for receiving a command from outside, a microprocessor 20 for reserving priority order with respect to an inputted serial data, and program memory 30 for restoring a run command program of the microprocessor 20. The duplexing system is further provided with reserve list memory 70 in which 2 bytes are allotted to each processor, and data memory 40 for temporarily storing or depleting needed data while running the program. The duplexing system is furthermore provided with cluster process 50 having a plurality of processors having N numbers by which N independent jobs are performed, and a back-up processor 60 for duplexing.

With respect to a duplexing system according to the present invention, a description of an allowing method of a reserve priority order in the duplexing system is as follows:

the microprocessor 20 monitors status of each reserve in a cluster reserve 50 and discriminates whenever an error is generated. The following cases occur as the status of an error generated in a process.

a) if an error is generated in plural processors, b) if an error is generated in a priority order processor which is in a prior order to a processor registered in a present back-up list while a channel card is backed-up, c) if a processor which is backing-up in a present reserve processor is restored, and d) if an error status of processor which is registered in a present back-up list is restored.

When the cases occur, the microprocessor 20 generates a reserve list according to a position of the input switch 10 and an inputted serial communication data, and the list is stored in the reserve list memory 70. Thus, the back-up processor 60 is substituted for the error processor and conducts its operation.

a) if an error is generated in plural processors

Figures 2A, 2B:
FIGS. 2A and 2B are one embodiment illustrating a status of the back-up list memory according to the present invention while an error occurs in plural processors.
Figure 3:
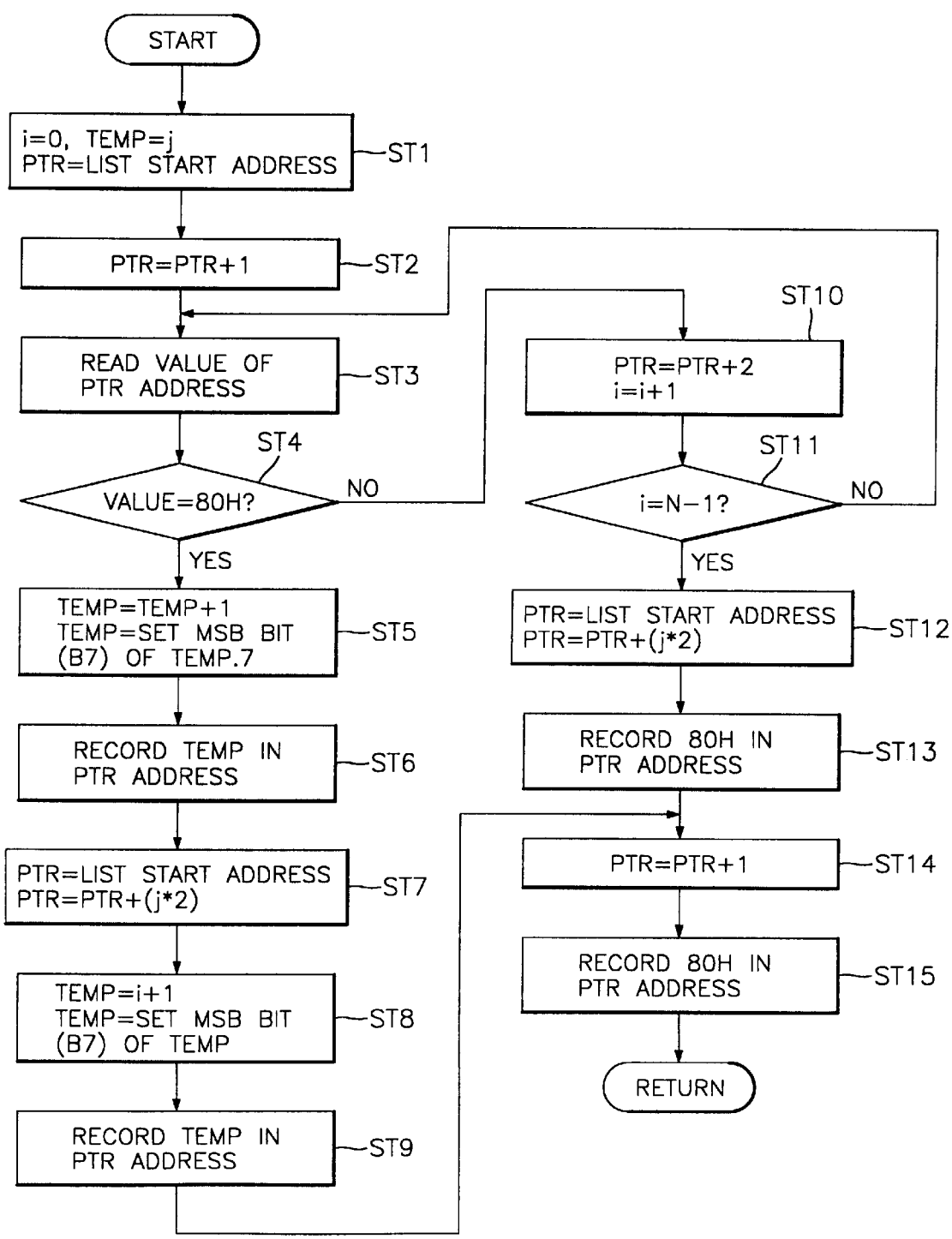
FIG. 3 is a flowchart showing recording steps of a reserve list in consecutive order while an error is generated in the processors.

If an error occurs in at least one processor while generating a back-up list, function of a processor in which the error is firstly generated according to the time sequence of the error generation is backed-up in the back-up process 60, whereas a processor in which no backed-up error occurs generates a sequence list according to the time sequence of error generation as shown in FIGS. 2A and 2B, and next the list is stored in the reserve list memory 70. The sequence of processors is P3, P5, P9, and P11. The processors mean the processors registered in a reserve order list except for a processor which is operated in a present back-up processor 60. The top priority order processor, among the processors registered in a present reserve order list, is the third processor P3. 80H is recorded in the first byte XX04H of a memory allocated in the processor. That means that if the top priority order 8th bit is set as 1, an error is generated in the corresponding processor and is registered in a reserve list, whereas the other bit is set as 0, and no leading order processor exists. 85H is recorded in the second byte XX05H. That means that if the top priority order 8th bit is set as 1, an error is generated in the corresponding processor and is registered in a back-up list, whereas the other bit is set as 5H, and the following order processor is P5. The remaining registered processors are illustrated similarly. Specially, the second byte of the last processor is 80H, which means that no last order processor exists, FIG. 3 shows a flowchart illustrating recording steps of a reserve list in consecutive order while an error is generated in plural processors.

In step ST1, a processor buffer i(=processor number−1) is initiated as 0, and a temporary memory location TEMP is set as j (the number of the processor to be registered−1=6: the 7th processor is a processor to be registered as shown in FIGS. 2A and 2B). A pointer PTR is set as a list start address XX0H and is initiated. In step ST2, 1 is added to the pointer PTR for determining whether processor P0 corresponding to a start address in which the pointer PTR is located is a last processor to be backed-up. In step ST3, a value of the incremental last address XX01H is read, and in step ST4, a determination is made whether or not the read value is 80H, which is a last item of the present list.

If the value of the list address read at step ST4 is not 80H, then the program proceeds to step ST10 for searching the next item. The number 2 is added to the pointer PTR and is transferred to the last address XX03H. Simultaneously, the number 1 is added to a processor buffer i and a number of processors are set as 2. Next, in step ST11, a determination is made whether or not the number 2 of processor gained in step ST10 is the same as the total number of processors. If the answer to this question is no, then the program returns to step ST3 for resuming the sequential steps. Since the value of the address XX03H being indicated by the pointer PTR is not 80H, the above steps are repeated so that the pointer PTR indicates XX09H, and the value of the address XX09H is 80H. Thus, the processor buffer i is 4 and next the program proceeds to step ST5.

In step ST5, the number 1 is added to the temporary memory location TEMP, for instance 6 at step ST1, in which j is stored. j means that 1 is subtracted from a number of processors to be registered. That is, TEMP is 7. Most Significant Bit B7 of the temporary memory location TEMP is set as 1 as shown in FIG. 4, which indicates that a list exists. In step ST6, a value of temporary memory location TEMP is recorded in the list address XX09H and is recorded as 87H as shown in FIG. 2. In step ST7, the pointer PTR is set as a list start address XX00H for searching a location of corresponding item. A value XX0CH which multiplies 2 to the last start address j is added to the list start address, which is set as a new list address. In step ST8, the number 1 is added to a processor buffer i(i=4), and the value is set in the temporary memory location TEMP, and Most Significant Bit B7 of the temporary memory location is set to indicate that the list exists in the set temporary memory location TEMP, i.e., 85H. Next, the new set temporary memory location TEMP 85H is recorded in the list address XX0CH (step ST9). In step ST14, the number 1 is added to the list address XX0CH. In next step ST15, 80H is recorded in the list address XX0DH which was previously established, and is registered as the last item of the list.

On the other hand, in step ST11, if a value of the processor buffer i gained in step ST10 is the same as the total number N−1 of process, it is determined that no value exists in the present list. In step ST12, the pointer PTR is set as a list start address XX00H, and next the pointer PTR is set as a list last address, which is defined as a last address of list memory to be reserved in the processor as list start address+(number of processor to be registered *2 ). In step ST13, 80H is recorded in the last address of list memory, and is registered as a last item of start list in step ST15.

b) if error is generated in a priority order processor which is in a prior order to a processor registered in a present back-up list while a back-up processor is reserve.

If an error occurs in another top priority order processor while a back-up processor is backed-up, the back-up procedure can not perform, and thus the microprocessor 20 registers the processor as the top priority in an order list.

Figure 5:
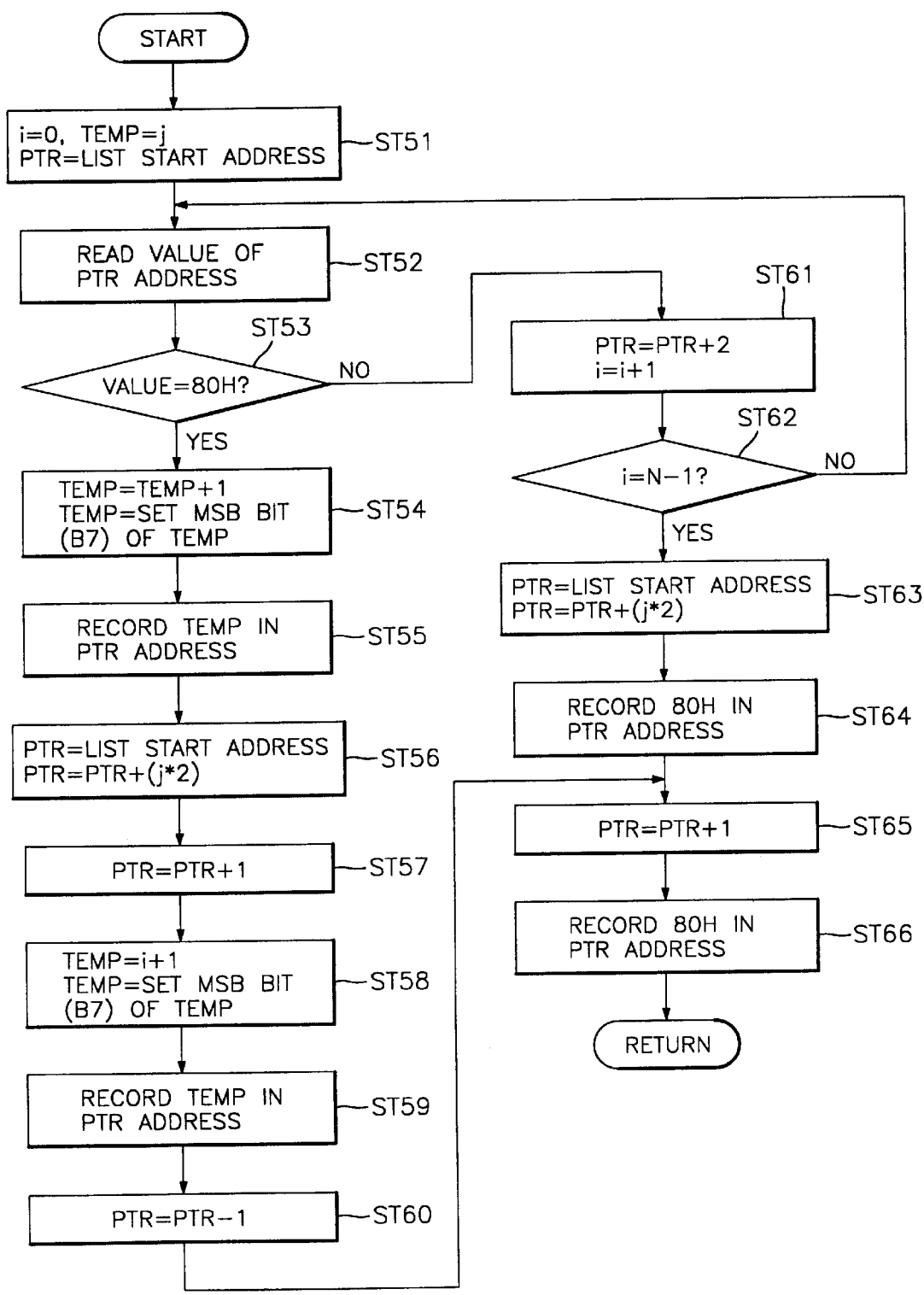
FIG. 5 is a flowchart showing registration steps in which a back-up processor is registered as a leading item of a reserve list memory.
Figures 6A, 6B:
FIGS. 6A and 6B are representations that an 8th processor is registered at a leading point of a reserve list memory.

FIG. 5 shows a flowchart registering a back-up processor as a leading item of a back-up list memory. FIGS. 6A and 6B show that a 8th processor is registered at a leading point of a reserve list memory.

In step ST51, a processor buffer i(=processor number−1) is initiated as 0, a temporary memory location TEMP is set as j(number of the processor to be registered−1=7: the 8th process is a processor to be registered as shown in FIGS. 6A and 6B). A pointer PTR is set as a list start address XX0H and is initiated. In step ST52, a value of a list address XX01H being indicated by a pointer PTR is read for determining whether processor P0 corresponding to a start address XX00H in which the pointer PTR is located is a top priority order processor to be backed-up. In step ST53, a determination is made whether or not the read value is 80H.

If the value of the list address read at step ST53 is not 80H, then the program proceeds to step ST61 for searching the next item. The number 2 is added to the pointer PTR and is transferred to the last address XX02H (FIG. 6). Simultaneously, the number 1 is added to a processor buffer i and a number of processors are set as 1. Next, in step SST62, a determination is made whether or not the number 1 of processor gained in step ST61 is the same as the total number N−1 of processor. If the answer to this question is no, then the program returns to step ST52 for resuming the sequential steps. A value of the increased list address XX02H (FIG. 6) is read, and the value of the address XX02H is 80H in step ST53. Thus, the processor buffer i is 1 and next the program proceeds to step ST54.

In step ST54, the number 1 is added to the temporary memory location TEMP, for instance 7 at step ST51, in which j is stored. j means that 1 is subtracted from a number of processor to be registered. That is, TEMP is 7. Most Significant Bit B7 of the temporary memory location TEMP is set as 1 as shown in FIG. 4, which indicates that a list exists. In step ST55, a value of temporary memory location TEMP is recorded in the list address XX02H and is recorded as 88H as shown in FIG. 6B. In step ST56, the pointer PTR is set as a list start address XX00H for searching an address of new top priority order processor. A value XX0EH which multiplies 2 to the list start address j is added to the list start address, which is set as a new list address. In step ST57, the number 1 is added to the pointer PTR, and the pointer PTR is set as new list address XX0FH. In step ST58, the number 1 is added to the processor buffer i(i=1) and the value(i=2) is set in the temporary memory location TEMP. Most Significant Bit B7 of the temporary memory location is set to indicate that the list exists in the set temporary memory location TEMP, i.e., 82H. Next, the new set temporary memory location TEMP 82H is recorded in the list address XX0FH (step ST59). In step ST60, the number 1 is subtracted from the list address XX0FH. In next step ST66, 80H is recorded in the list address XX0EH which was previously established, and is registered in the list as the top priority order processor.

On the other hand, in step ST62, if a value of the address buffer i gained in step ST61 is the same as the total number N−1 of process, it is determined that no value exists in the present list. In step ST63, the pointer PTR is set as a list start address XX00H (FIG. 6), and next the pointer PTR is set as a list last address XX0EH, which is defined as a last address of list memory to be reserved in processor as list start address+(number of processor to be registered *2 ). In step ST64, 80H is recorded in the address XX0EH which is indicated by the pointer PTR as shown in FIG. 7, and the number 1 is added to the pointer PTR, indicating the address XX0FH in step ST65, and 80H is recorded as shown in FIG. 7 in the address XX0FH which is indicated by the pointer PTR in step ST66.

c) if a processor which is backing-up in a present channel card is restored

If a processor which is backing-up from the present channel card 60 is restored, a channel card 60 is in a waiting status, and the processor in a top priority order is detected from a reserve list memory 70 and is backed-up.

Figure 8:
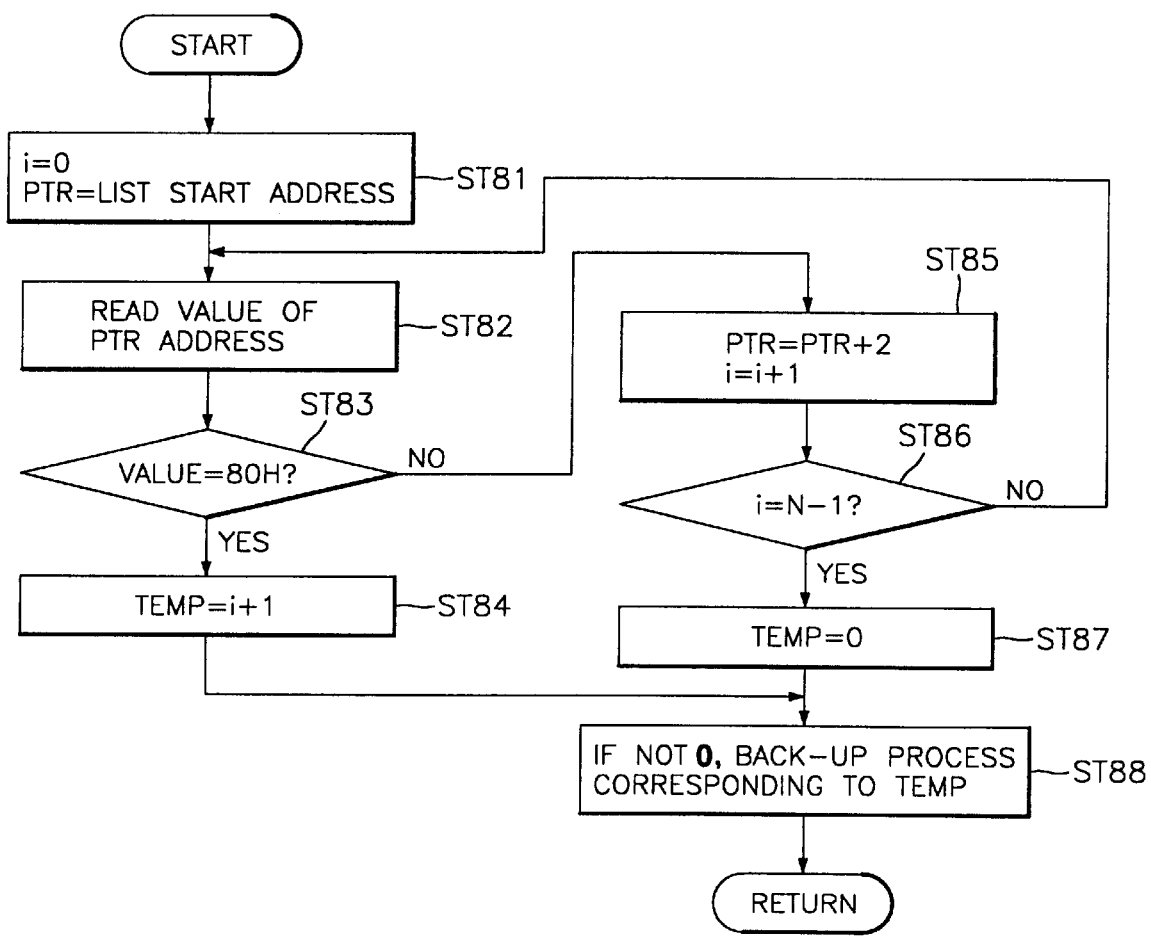
FIG. 8 is a flowchart showing recording steps of a reserve list in consecutive manner while an error is generated in the processors.

FIG. 8 shows a flowchart illustrating steps for retrieving a top priority order processor from a reserve list memory when a processor which is backing-up is restored.

In step ST81, a processor buffer i(=processor number−1) is initiated as 0, and a pointer PTR is set as a list start address XX00H (FIG. 6) and is initiated. In step ST82, a value of a list address XX00H being indicated by a pointer PTR is read to determine whether processor P0 corresponding to a start address XX00H in which the pointer PTR is located is a top priority order processor to be backed-up. In step ST83, a determination is made whether or not the read value is 80H.

If the value of the list address read at step ST83 is not 80H, then the program proceeds to step ST85 for searching the next item. The number 2 is added to the pointer PTR and transferred to the list address XX02H (FIG. 6). Simultaneously, the number 1 is added to a processor buffer i and a number of processor is set as 1. Next, in step ST86, a determination is made whether or not the number of processors gained in step ST85 is the same as total number N−1 of processor. If the answer to this question is no, then the program returns to step ST82 for resuming the sequential steps. A value of the increased list address XX02H (FIG. 6) is read, and the value of the address XX02H is 80H in step ST83. Thus, the processor buffer i is 1, and next the program proceeds to step ST84.

In step ST84, temporary memory location TEMP is set as processor buffer i+1=2 (FIG. 6). In step ST88, the processor which corresponds to a number of processors stored in a temporary memory location TEMP is backed-up. However, if 0 is stored in the temporary memory location TEMP, no value is stored in the reserve list memory 70 and the back-up procedure is not performed, thus resuming to a main program.

d) if error status of processor which is registered in a present back-up list

If at least one processor is restored from processors registered in the present reserve list memory 70, a corresponding item is deleted from the reserve list memory 70, and the front and the rear items are connected with following items, thus maintaining a convenient order retrieval of a reserve list.

Figure 9A:
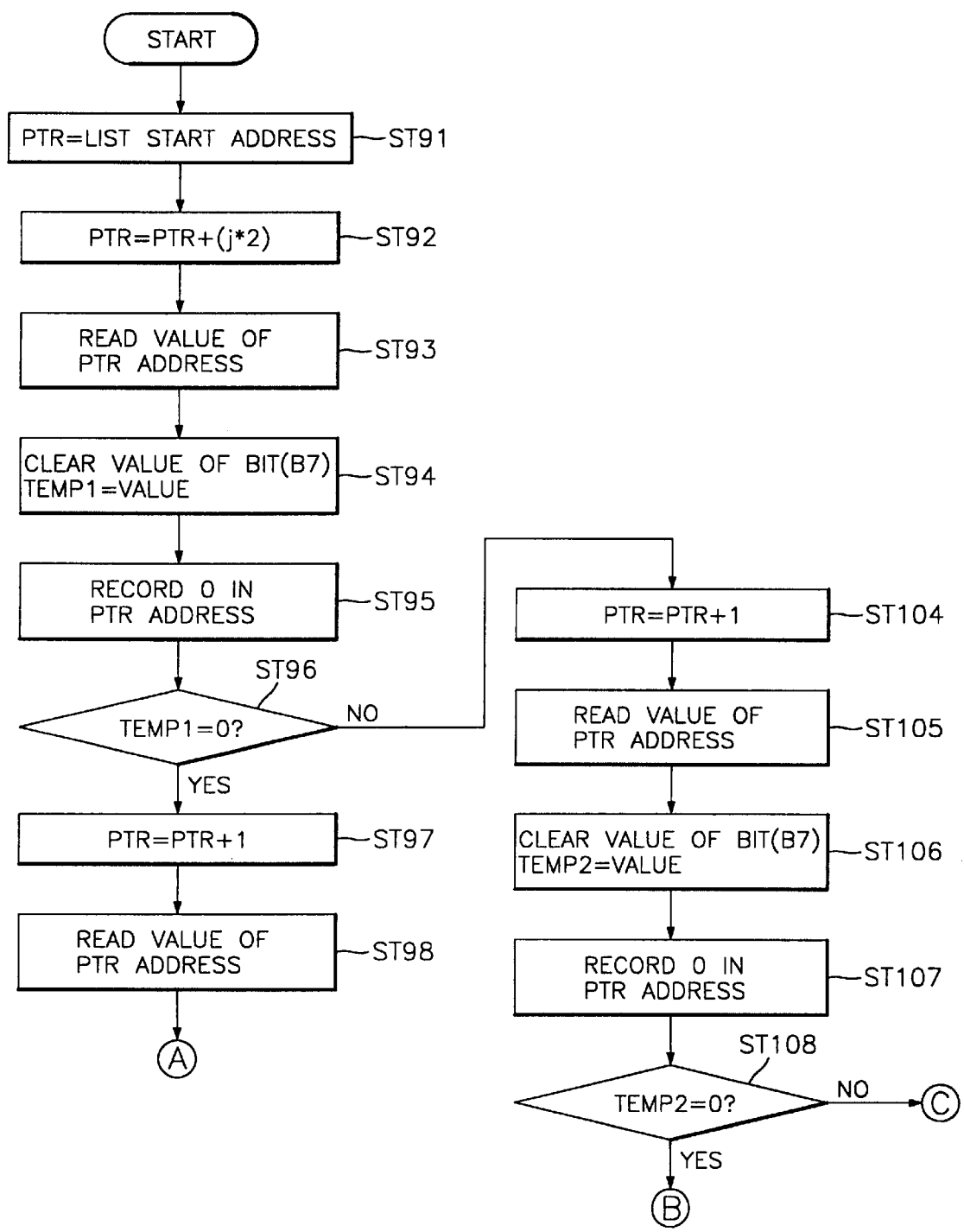
FIGS. 9A and 9B are flowcharts showing steps of deleting a corresponding processor from a back-up list while a processor error registered in a reserve list is restored.
Figure 9B:
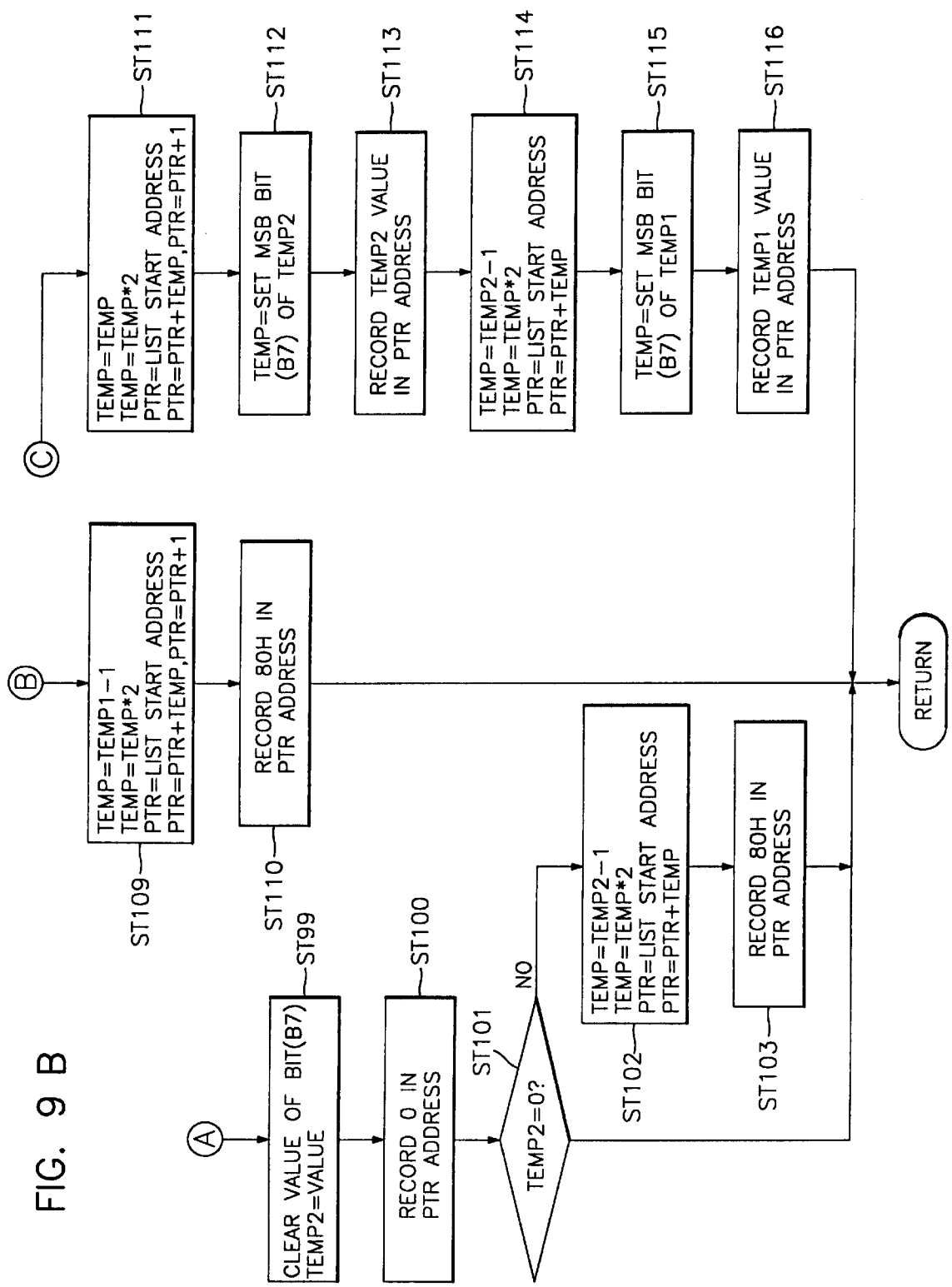
Figures 10A, 10B:
FIGS. 10A and 10B are representations of the status of a reserve list before a restoring procedure and after a restoring procedure, respectively.
Figures 11A, 11B:
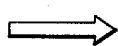
FIGS. 11A and 11B are representations that one processor is restored and deleted from a reserve list memory in which two processes are registered.
Figure 12A:
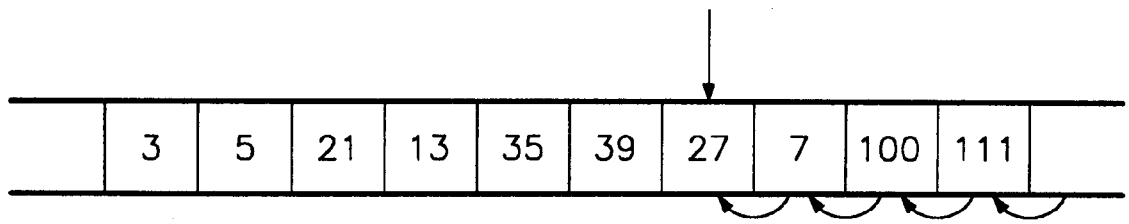
FIGS. 12A and 12B are representations that a new item is inserted and deleted from a reserve list according to a prior art.
Figure 12A:
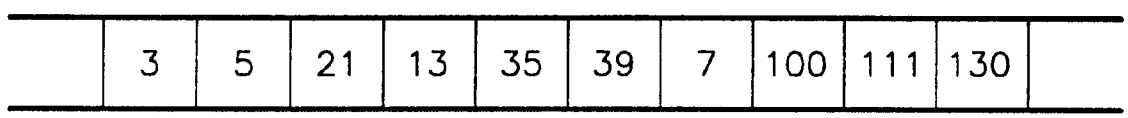
Figure 12B:
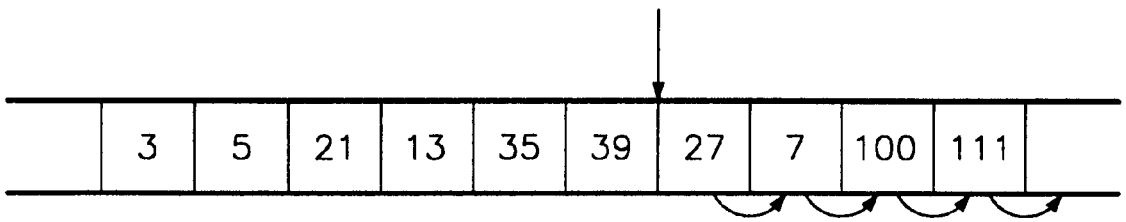
Figure 12B:
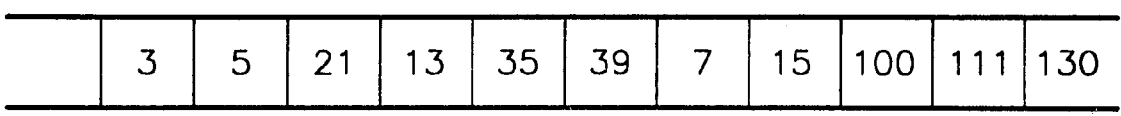

FIGS. 9A and 9B show a flowchart showing steps of deleting a corresponding processor from a reserve list while an error of processor registered in a back-up list is restored. FIG. 10A represents a status of a reserve list 70 illustrating that the processor is registered in successive processes P1, P4, and P8 order. FIG. 10B represents status of a reserve list illustrating that processor P4 is restored and deleted.

In step ST91, a pointer PTR is set as a list start address XX00H. In step ST92, a value XX08H which multiplies 2 to the list start address j, for instance a number of processor to be restored minus 1 equals 4, is added to the pointer PTR, which is set as a new list address. In step ST93, a value 82H of the list address XX08H which is indicated by the pointer PTR is read. In step ST94, Most Significant Bit B7 which is contained in a value 82H of the list address XX08H is cleared, and the value 02H is stored in a second temporary memory location TEMPT. In step ST95, 0 is recorded in the address XX08H indicated by the pointer PTR. In step ST96, a determination is made whether or not the value stored in the second temporary memory location is 0.

If the value is not 0, then the program proceeds to step ST104. The number 1 is added to the pointer PTR and a new list address XX09H is set as the pointer PTR. In step ST105, a value 89H of the list address XX0H indicated by the pointer PTR is read. In step ST106, Most Significant Bit B7 which is contained in a value 89H of the list address XX09H is cleared, and the value 09H is stored in a third temporary memory location TEMP2. In step ST107, 0 is recorded in the address XX09H indicated by the pointer PTR. In step ST108, a determination is made whether or not the value stored in the third temporary memory location TEMP2 is 0.

If the value is not 0, then the program proceeds to step ST111, see FIG. (9B). The number 1 is subtracted from a value, for instance 02H, of the second temporary memory location TEMPT. The subtracted value, for instance 01H, is stored in the first temporary memory location TEMP. The number 2 is multiplied by the value 01H of the first temporary memory location TEMP, which is stored in the first temporary memory location TEMP as the value 02H. The pointer PTR is set as a list start address XX00H. The value of the first temporary memory location TEMP is added to the pointer PTR, which becomes XX02H. Next, 1 is added to the pointer PTR, which becomes XX03H.

In step ST112, Most Significant Bit B7 of the third temporary memory location TEMP2 is set as 1 (TEMP2=89H), and in step ST113, the value 89H of the third temporary memory location TEMP2 is stored in the address XX03H indicated by the pointer PTR.

In step ST114, the number 1 is subtracted from a value, for instance 09H, of the third temporary memory location TEMP2. The subtracted value, for instance 08H, is stored in the first temporary memory location TEMP. The number 2 is multiplied by the value 01H of the first temporary memory location TEMP, which is stored in the first temporary memory location TEMP as the value 10H. The pointer PTR is set as a list start address XX00H. The value of the first temporary memory location TEMP is added to the pointer PTR, which becomes XX10H.

In step ST115, Most Significant Bit B7 of the second temporary memory location TEMPT is set as 1 (TEMP1=82H), and in step ST116, the value 82H of the second temporary memory location TEMPT is stored in the address XX10H indicated by the pointer PTR.

In a reserve list memory 70 in which the processors are backed-up and registered in P1 though P8 order, the case for deleting the restored processor P8 is illustrated as follows:

The description from step ST91 through step ST95 is the same as the previous one, thus the detailed description thereof will be omitted. In step ST96, if a value of the second memory location TEMPT is 02H, then the program proceeds to step ST104. The number 1 is added to the pointer PTR, and the pointer PTR is set as a new list address XX09H. In step ST105, the value 80H of the list address XX09H indicated by the pointer PTR is read. In step ST106, Most Significant Bit B7 of the value 89H of the list address XX09H is cleared, and the value is stored in the third temporary memory location TEMP2. In step ST107, 0 is recorded in the list address XX09H indicated by the pointer PTR. In step ST108, a determination is made whether or not the value stored in the third temporary memory location TEMP2 is 0. If the value is not 0, then the program proceeds to step ST109. The number 1 is subtracted from a value, for instance 02H, of the second temporary memory location TEMPT. The subtracted value, for instance 01H, is stored in the first temporary memory location TEMP. The number 2 is multiplied by the value 01H of the first temporary memory location TEMP, which is stored in the first temporary memory location TEMP as the value 02H. The pointer PTR is set as a list start address XX00H. The value of the first temporary memory location TEMP is added to the pointer PTR, which becomes XX02H. Next, 1 is added to the pointer PTR, which becomes XX03H. In step ST110, the value 80H is recorded in the list address XX03H indicated by the pointer PTR, and thus resumes to a main program.

In a reserve list memory 70 in which the processors are backed-up and registered in P1 though P8 order, the case for deleting the restored processor P1 is illustrated as follows:

In step ST91, a pointer PTR is set as a list start address XX00H. In step ST92, a value XX02H which multiplies 2 by the list start address j, for instance a number of processors to be restored minus 1 equals 1, is added to the pointer PTR, which is set as a new list address. In step ST93, a value 80H of the list address XX02H which is indicated by the pointer PTR is read. In step ST94, Most Significant Bit 7 which is contained in a value 80H of the list address XX02H is cleared, and the value 00H is stored in a second temporary memory location TEMPT. In step ST95, 0 is recorded in the address XX02H indicated by the pointer PTR. In step ST96, a determination is made as whether or not the value stored in the second temporary memory location TEMPT is 0.

If the value is 0, then the program proceeds to step ST97. The number 1 is added to the pointer PTR and a new list address XX03H is set as the pointer PTR. In step ST98, a value 85H of the list address XX03H indicated by the pointer PTR is read. In step ST99, Most Significant Bit B7 which is contained in a value 85H of the list address XX03H is cleared, and the value 05H is stored in the third temporary memory location TEMP2. In step ST100, 0 is recorded in the address XX03H indicated by the pointer PTR. In step ST101, a determination is made whether or not the value stored in the third temporary memory location TEMP2 is 0.

If the value is not 0, that is, the value is 05H, then the program proceeds to step ST102. The number 1 is subtracted from a value, for instance 05H, of the third temporary memory location TEMP2. The substracted value, for instance 04H, is stored in the first temporary memory location TEMP. The number 2 is multiplied by the value 04H of the first temporary memory location TEMP, which is stored in the first temporary memory location TEMP as the value 08H. The pointer PTR is set as a list start address XX00H. The value of the first temporary memory location TEMP is added to the pointer PTR, which become XX08H. In step ST103, the value 80H is recorded in the address XX08H indicated by the pointer PTR, and then resumes to a main program.

According to the present invention as described above, since a list is easily generated with respect to a reserve priority order processor, a reserve list is conveniently generated and a priority order is easily changeable.

What is claimed:

1. A method for writing a reserve list of a duplexing system which performs plural processors, steps of said method comprising:

reserving two bytes per each processor in sequence of said plural processors;

storing a number of leading order processors in a first byte;

storing a number of following order processors in a second byte; wherein if an error is generated in the plural processors, said method comprises the following steps:

a first step including:
initializing a processor buffer which stores the number of processors, storing data which subtracts 1 from said processor number being registered in a reserve list in a temporary memory location, and moving a start address of said reserve list to a pointer;

a second step including:
retrieving a second byte of address which is reserved in each processor, determining whether said processor buffer which has one increment each is the last number of said processor, and detecting an address in which the last order processor is reserved;

a third step including:
adding 1 to data which is stored in said temporary memory location, and storing the value to said second byte of said detected address;

a fourth step including:
moving said pointer to an address which is reserved in a registered processor of said first step, storing at said temporary memory location a value which is added 1 to processor buffer of said second step, and storing data stored in said temporary memory location in said address having the moved pointer;

a fifth step including:
increasing said pointer of said fourth step by 1, and storing data indicating the last order processor in said address; and a sixth step including:
storing data indicating the last order processor in a first byte of address reserved in the registered processor of said first step when said processor buffer of said second step is the number of the last processor.

2. A method for writing a reserve list of a duplexing system which performs plural processors, steps of said method comprising:

reserving two bytes per each processor in sequence of said plural processors;

storing a number of leading order processors in a first byte;

storing a number of following order processors in a second byte; wherein if a back-up processor is operating and an error is generated in a priority order processor over a processor registered in the present reserve list, steps of said method comprises:

a first step including:
initializing a processor buffer which stores the number of processor, storing data which subtracts 1 from said processor number being registered in a reserve list in a temporary memory location, and moving a start address of said reserve list to a pointer;

a second step including:
retrieving a first byte of address which is reserved in each processor, determining whether said processor buffer which has one increment each is the last number of said processor, and detecting an address in which the previous priority order processor is reserved;

a third step including:
adding 1 to data which is stored in said temporary memory location, storing the value to said first byte of said address in which the previous top priority order processor is reserved, and indicating that the previous top priority order processor is the following order to the registering processor:

a fourth step including:
moving said pointer to an address of a second byte of memory which is reserved in said registering processor, storing the number of previous top priority order processor at said first byte of memory data indicating the top priority order processor, and indicating said registering processor in the leading order over the previous top priority order processor; and a fifth step including:
deciding that no channel card is registered in the present list when said processor buffer is the last number in said second step, storing data indicating the top priority processor in said first byte of said address reserved in the registering processor, and storing data indicating the last order processor in said second byte.

3. A method for writing a reserve list of a duplexing system which performs plural processors, steps of said method comprising:

reserving two bytes per each processor in sequence of said plural processors;

storing a number of leading order processors in a first byte;

storing a number of following order processors in a second byte; wherein if a channel card is restored in the present channel card, steps of said method comprising:

a first step including:
initializing a processor buffer which stores the number of processor, and moving a star address of said reserve list to a pointer;

a second step including:
retrieving a first byte of an address which is reserved in each processor, determining whether said processor buffer which has one increment each is the last number of said processor, and detecting an address in which the top priority order processor is reserved;

a third step including:
adding 1 to said processor buffer, storing the value to a temporary memory location, and reserving a processor corresponding to the value: and a fourth step including:
deciding that no processor is registered in the present list when the value which increases said processor buffer by increment 1 in said second step is the last number of said processor.

4. A method for writing a reserve list of a duplexing system which performs plural processors, steps of said method comprising:

reserving two bytes per each processor in sequence of said plural processors;

storing a number of leading order processors in a first byte;

storing a number of following order processors in a second byte; wherein if a channel card is restored in the present channel card, steps of said method comprising:

a first step including:
detecting the number of a leading order processors stored in a first byte of memory which is reserved in said restored processor, storing said number in a second temporary memory location, clearing said byte, and determining whether data stored in said second temporary memory location is data indicating the top priority order processor;

a second step including:
detecting the number of a following order processors stored in a second byte of memory which is reserved in said restored processor when data stored in said second temporary memory location is not the data indicating the top priority order processor, storing said number in a third temporary memory location, clearing said byte, and determining whether data stored in said third temporary memory location is data indicating the last order processor;

a third step including:
detecting an address of memory which is reserved in said leading order processor from the number of leading order processor stored in said second temporary memory location when data stored in said third temporary memory location is not the data indicating the last order processor, and storing in said second byte said number of following order processor which is stored in said third temporary memory location;

a fourth step including:
detecting an address of memory which is reserved in said following order processor from the number of following order processors which is stored in said third temporary memory location, and storing in said first byte a leading order processor which is stored in second temporary memory location;

a fifth step including:
detecting the number of a following order processor stored in said second byte of memory which is reserved in said restored processor when data stored in said second temporary memory location is the data indicating the top priority order processor, storing said number in said third temporary memory location, clearing said byte, and determining whether data stored in said third temporary memory location is data indicating the last order processor;

a sixth step including:
when data stored in said third temporary memory location at said fifth step is the data indicating the last order processor, returning to a main program, or when data stored in said third temporary memory location at said fifth step is not the data indicating the last order processor, detecting an address of memory which is reserved in said following order processor from the number of following order processors which is stored in said third temporary memory location, and storing in said first byte data indicating the top priority order processor; and a seventh step including:
detecting an address of memory which is reserved in a leading order processor from number of leading memory stored in said second temporary memory location when data stored in said third temporary memory location at said second step is the data indicating the last order processor, and storing said data indicating the last order processor in said second byte.

5. In a duplexing system for running plural processors and duplexing with a back-up processor, said duplexing system comprising:

an input switch for receiving command from outside;
a microprocessor for allotting back-up priority order with respect to an input serial data;
program memory for storing a run command program of said microprocessor;
reserve list memory in which two bytes being allotted to each processor, a number of leading order processors being stored in a first byte, and number of following order processors being stored in a second byte;
data memory for temporarily storing or reading needed data while running said program;
processor section including a plurality of processors by which N independent jobs are performed; and
channel card for duplexing;
wherein if an error occurs at the other priority order processor during back-up procedure, address of said reserve list memory which stores a top priority number at said first byte is detected;
the number of said other priority order processors is stored at said first byte;
said top priority number is stored at said first byte of memory reserved at the other priority order processor; and
the number of detected processors is stored at said second byte.

6. In a duplexing system for running plural processors and duplexing with a back-up processor, said duplexing system comprising:

an input switch for receiving command from outside;
a microprocessor for allotting back-up priority order with respect to an input serial data;
program memory for storing a run command program of said microprocessor;
reserve list memory in which two bytes being allotted to each processor, a number of leading order processors being stored in a first byte, and number of following order processors being stored in a second byte;
data memory for temporarily storing or reading needed data while running said program;
processor section including a plurality of processors by which N independent jobs are performed; and
channel card for duplexing;
wherein if a channel card is restored from the present channel card, and an address which stores said top priority number is detected from said reserve list memory, then a processor corresponding to said address is backed-up.

7. In a duplexing system for running plural processors and duplexing with a back-up processor, said duplexing system comprising:

an input switch for receiving command from outside;
a microprocessor for allotting priority order with respect to an input serial data;
program memory for storing a run command program of said microprocessor;
reserve list memory in which two bytes being allotted to each processor, a number of leading order processors being stored in a first byte, and number of following order processors being stored in a second byte;
data memory for temporarily storing or reading needed data while running said program;
processor section including a plurality of processors by which N independent jobs are performed; and
channel card for duplexing;
wherein if an error status of processor which is registered at the present reserve list is restored, and a number of the leading order processors which are stored at said first byte of memory allotted to said restored processor is detected and is stored at a second temporary memory location, and then next said first byte is cleared;
and if the number of the following order processors which are stored at said second byte is detected and is stored at a third temporary memory location, and then next said second byte is cleared; and
an address reserved at said leading order processors is detected from said number of the leading order processors which are stored at said second temporary memory location, then a following order processors stored at said third temporary memory location is stored at said second byte, next said restored processor item is deleted, and a leading item is linked with a following item.

8. The duplexing system according to claim 5, wherein
if the last order processor among processors registered at the present reserve list is restored,
the number of the leading order processors which is stored at said first byte of memory allotted to said restored last order processor is detected and is stored at said second temporary memory location, and said first byte is cleared; and if data indicating no following order processor stored at said second byte is detected and is stored at a third temporary memory location, and said second byte is cleared, then an address allotted to said leading order processor is detected from the number of the leading order processors which is stored at said second temporary memory location, data indicating no following order processor stored at said third temporary memory location is stored at second byte, and next said restored processor is deleted.

9. The duplexing system according to claim 5, wherein if the top priority order processor among processors registered at the present reserve list is restored, data indicating the top priority memory order processor which is stored at said first byte of memory allotted to said restored processor is detected and is stored at second temporary memory location, and said first byte is cleared;

the number of following order processors which are stored at said second byte is detected and is stored at third temporary memory location, and said second byte is cleared; and said allotted address is detected from the number of the following order processors which are stored at said third temporary memory location, data indicating the top priority order processor stored at said second temporary memory location is stored at said first byte, then a next restored top priority order processor is deleted.

* * * * *